R. F. STEWART.
BUTTER HANDLING MACHINE.
APPLICATION FILED APR. 24, 1920.

1,432,919.

Patented Oct. 24, 1922.
7 SHEETS—SHEET 1.

Inventor
Richard F. Stewart

R. F. STEWART.
BUTTER HANDLING MACHINE.
APPLICATION FILED APR. 24, 1920.

1,432,919.

Patented Oct. 24, 1922.
7 SHEETS—SHEET 3.

Fig. 3.

Inventor
Richard F. Stewart
By Cushman, Bryant
+ Darby
Attorney

R. F. STEWART.
BUTTER HANDLING MACHINE.
APPLICATION FILED APR. 24, 1920.

1,432,919.

Patented Oct. 24, 1922.
7 SHEETS—SHEET 7.

Patented Oct. 24, 1922.

1,432,919

UNITED STATES PATENT OFFICE.

RICHARD F. STEWART, OF BRIARCLIFF MANOR, NEW YORK.

BUTTER-HANDLING MACHINE.

Application filed April 24, 1920. Serial No. 376,397.

*To all whom it may concern:*

Be it known that I, RICHARD F. STEWART, a citizen of the United States, residing at Briarcliff Manor, in the county of Westchester and State of New York, have invented new and useful Improvements in Butter-Handling Machines, of which the following is a specification.

This invention relates to machines for forming moldable material into blocks or prints, and while it is particularly designed for forming blocks or prints of butter, and will be so described, it will be understood that it may be used with other moldable material.

It has for its object to provide means for slabbing a mass or tub of butter; means automatic in operation, for severing blocks successively from a slab of butter fed to it; forcing said successively severed blocks together and advancing them in the form of a continuous bar; shaping, solidifying, and, if desired, splitting longitudinally such bar; and finally, as herein shown, by manually operated means, cutting off the end of the shaped and solidified bar to form a print, or, if the bar be split, a plurality of prints; means being provided for regulating and standardizing the size of such prints.

These results are accomplished by providing a round table or plate on which the mass or tub of butter is placed, with which table a slab-forming mechanism co-operates to divide the tub of butter into slags; providing a receiving box to which the butter slab is fed; so arranging a severing device in said box that it will sever a block at regular intervals from the slab; so disposing a block advancing instrumentality that it will force the blocks severed from the slab, end to end through the box, shaping them and forming them into a continuous, solid bar; providing means for splitting said bar into a plurality of bars; mounting at the delivery end of the machine a print cutting-off device which will be actuated to cut from the bar prints of a regulated and standard size; and providing a receiving table which will spread or separate the prints so they may be readily and separately handled.

In the drawings herewith I have illustrated one embodiment of my invention, but it will be understood that this disclosure is illustrative and in no sense restrictive of my invention, as mechanical variations in structure may be made without departing from the invention herein set forth and claimed.

In said drawings:

Fig. 4 is a vertical transverse section substantially on line 4—4 of Fig. 3.

In referring to the drawings, like reference characters will indicate like parts in the several views, and the mechanisms going to make up the machine will be described in sequence of operation.

*Slab forming mechanism.*—The frame 10 of the machine may be of any suitable or desired construction and comprises supporting legs and horizontal braces of appropriate construction. Mounted upon this frame is the bed or table 11 of the machine of suitable construction, the entire frame and table being preferably formed of channeled iron or other suitable metal in order to give lightness and rigidity.

Figures 1, 11, 12, 13:
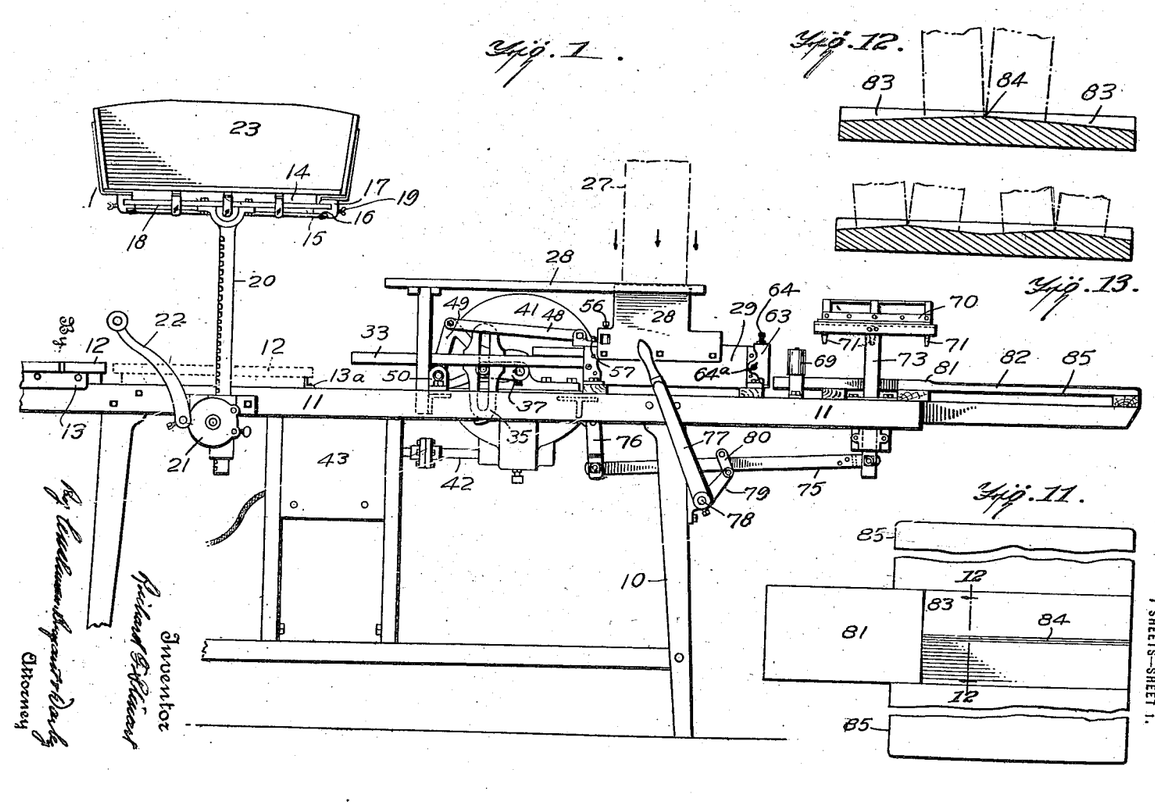
Fig. 1 is a view in side elevation of my machine.
Fig. 11 is a plan view of the print receiving table.
Fig. 12 is a sectional view on substantially the line 12—12, Fig. 11, of the print separating table.
Fig. 13 is a view similar to Fig. 12 of a print separating table having a plurality of print separating surfaces.

The table 11 is provided at one end (the left hand end as shown in Fig. 1) with a receiving plate 12, mounted so as to slide longitudinally of the table 11 from the position shown in full lines in Fig. 1 to the position shown in dotted lines in said figure, runner blades 13 being provided on either side of the plate 12 so as to guide the same in its sliding movements, and a stop 13ᵃ being provided to limit the movements of the plate and center it beneath the slab cutter. The plate 12 is designed to receive the block of butter when in its full line position, and after the block has been deposited thereon will be slid to its dotted line position beneath a cutter frame 14, which carries cross wires 15, engaged by hooks 16 on the clamps 17, secured to the bars of the cutter frame 18, the hooks 16 having thumb nuts 19, by which they may be drawn up or extended so as to properly tension the wires. The frame 14 is mounted on a plurality of rack bars 20, which slide in keepers 21, mounted on the side bars of the table 11, and one at least of these rack bars is engaged, and the bars and frame driven, by means of suitable cog wheels (not shown) housed within the keeper casings 21, and driven by a crank arm 22, having a pinion (not shown) coupled with the rack engaged cog wheel. With this arrangement the cutter frame 14 may be raised and lowered, and its crossed wires will sever the tub or block of butter into slabs or bars of uniform dimensions. The cutter frame has extending upwardly therefrom the wall portions 23 which serve to prevent the slabs from falling when the block is cut, but it will be observed that these walls 23 flare outwardly in an upward direction so that the slabs can tilt slightly, thus separating them so that they may be readily removed.

Figure 17:
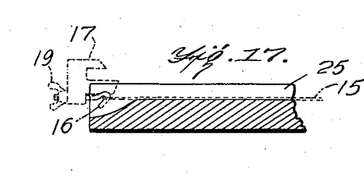
Fig. 17 is a detail sectional view on substantially the line 17—17 of Fig. 16, with the cutter wire in dotted lines.
Figure 18:
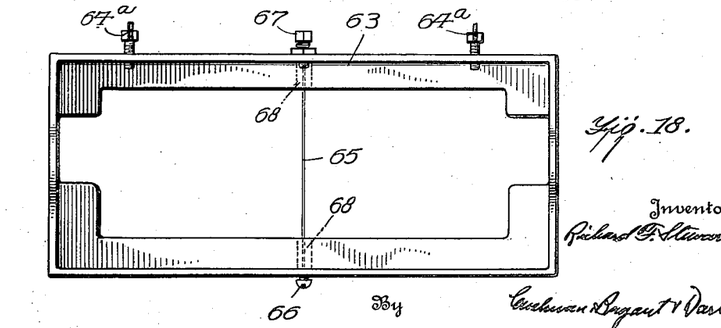
Fig. 18 is a view in end elevation of the slab splitting cutter frame.
Figure 19:
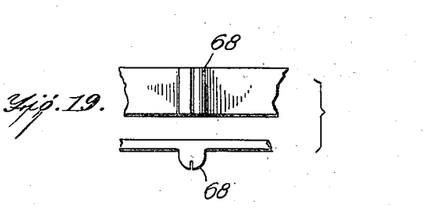
Fig. 19 shows in elevation and plan the wire receiving lugs on the slab splitting frame.

The sliding plate or table 12 is grooved or channeled to form recesses 24 for the wires 15 of the cutter so that the wires will cut completely through the block of butter, and preferably two of these recesses 25 will be made wider than the others. The purpose of making the recesses 25 wider, is to adapt the machine to cutting blocks of butter of various density. Where the butter is soft there will be considerable compression of it as the slabs cut from the block pass through the machine, and by setting the wires on the cutter frame which cooperates with the plate 12 wider apart, the cross-section of the slabs will be proportionately increased, and a proper compression of such increased slab will be given. By providing the wide recesses 25 the wires may be adjusted to take care of this condition. The ends of these channels 24 and 26 are as shown in Fig. 17 beveled downwardly in order that the ends of the recesses may give a sufficient clearance for the hooks 16, on which the wires are strung, and permit the wires 15 to pass clear through the block and completely sever it.

This constitutes the slab forming mechanism of the machine, which performs the initial operation of slabbing the tub or block.

Figure 2:
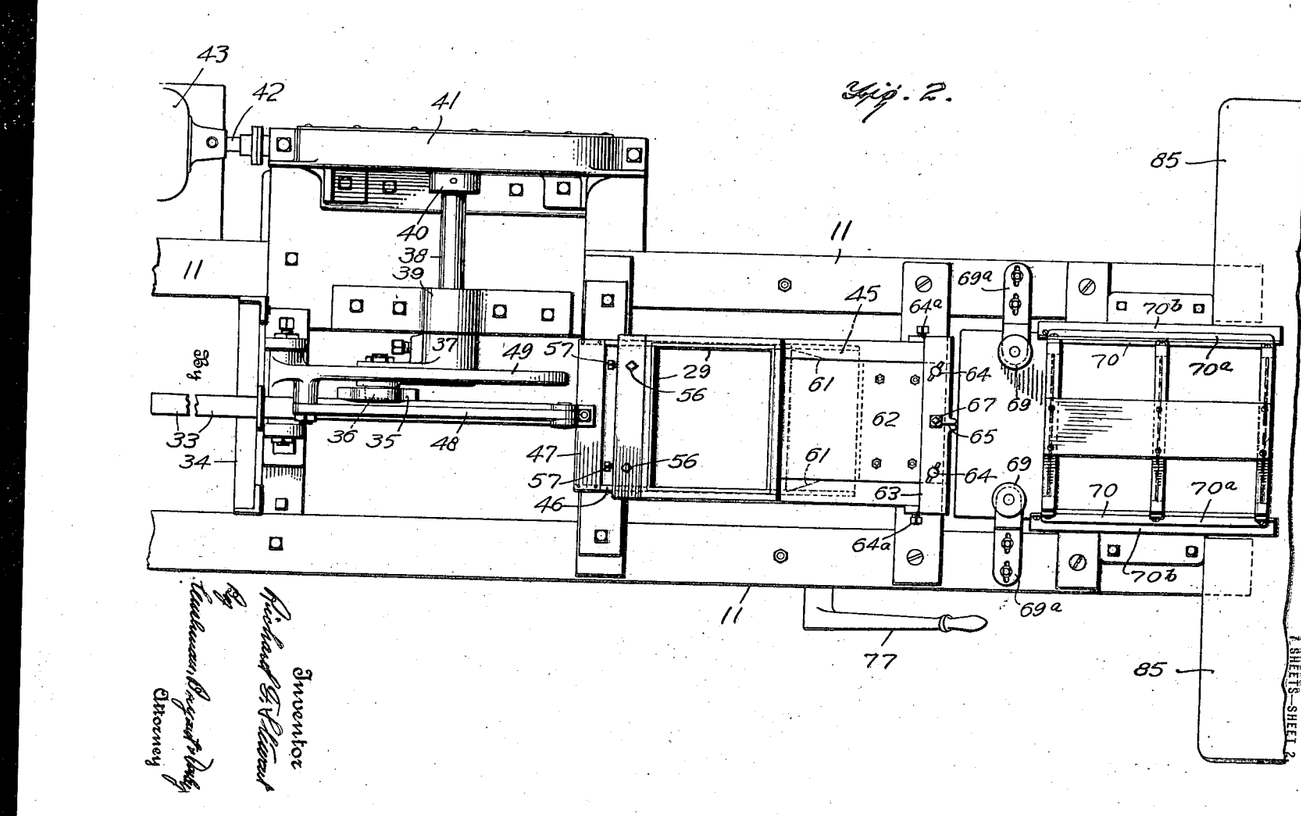
Fig. 2 is a plan view of the main part of the machine, the end portions being broken away.
Figure 3:
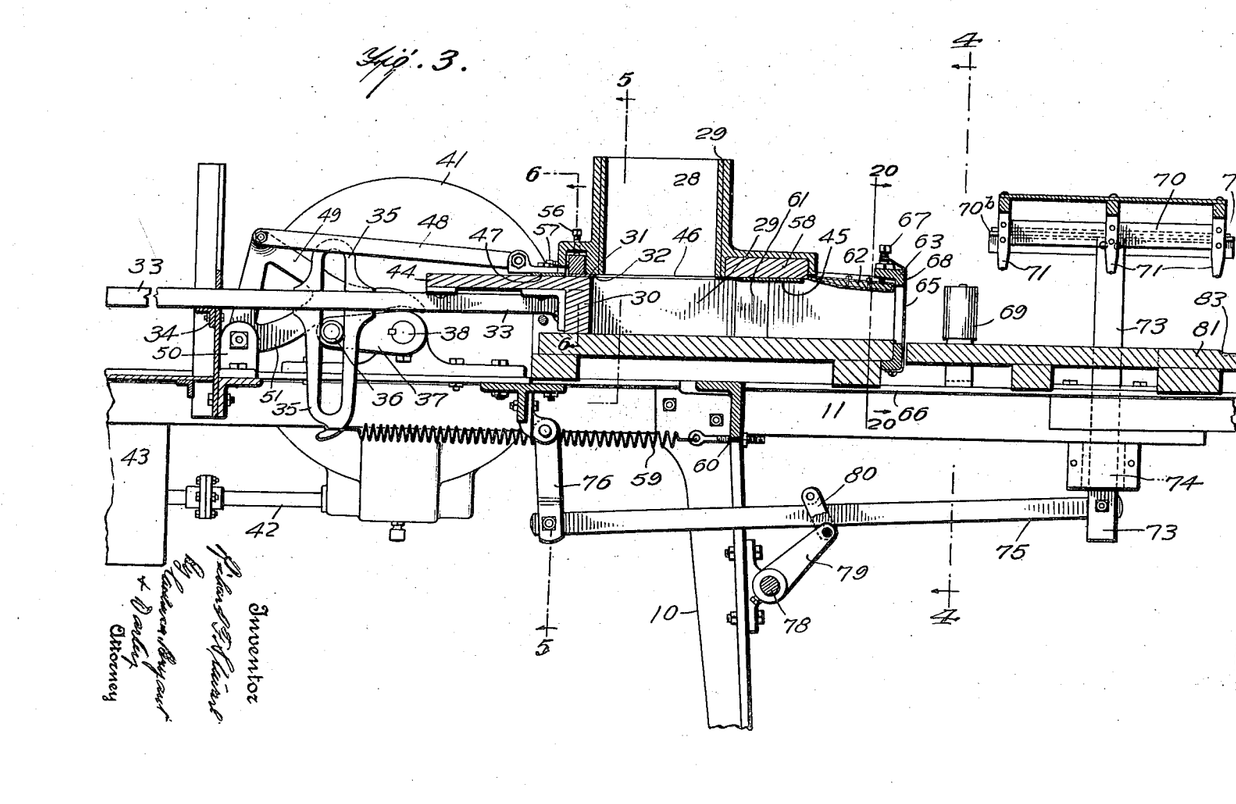
Fig. 3 is a sectional view of the main part of the machine, the ends being broken away.
Figures 5, 14, 15:
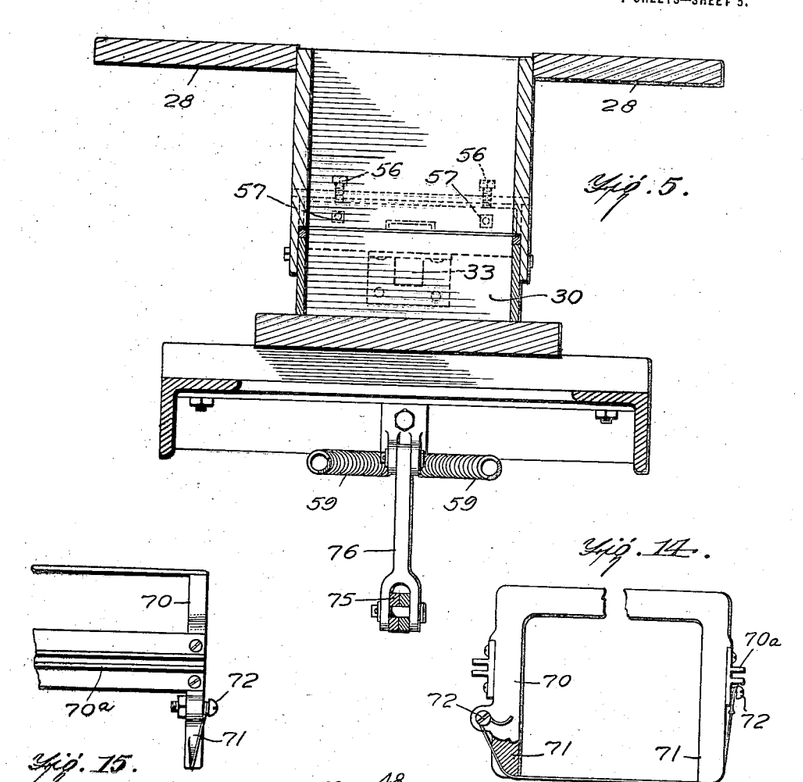
Fig. 5 is a detail sectional view on substantially the line 5—5 of Fig. 3.
Fig. 14 is a view in elevation of a print cutting element, broken away centrally.
Fig. 15 is a view in side elevation of one end of the print cutting element of Fig. 14.
Figure 6:
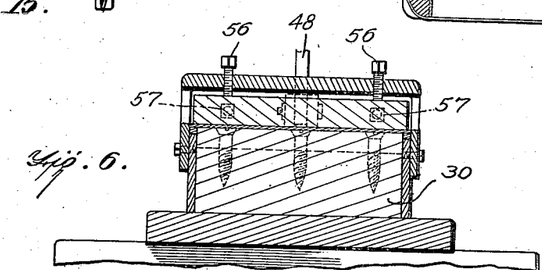
Fig. 6 is a detail sectional view on substantially the line 6—6 of Fig. 3.
Figures 7, 20:
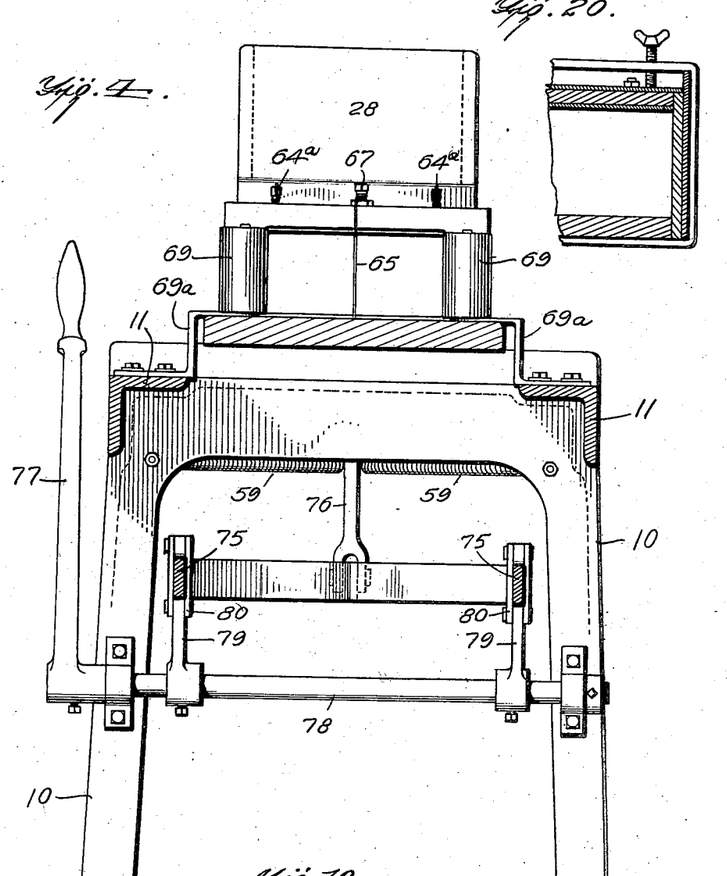
Figs. 7, 8 and 9 are longitudinal sectional views through the mold box, showing the block forming knives, the block plunger, and the cut-off plate, in different positions; so much of the operating mechanism for these reciprocating parts being shown as is necessary.
Fig. 20 is a cross sectional view of the mold box substantially on the line 20—20 of Fig. 3, looking toward the delivery end of the mold box.
Figure 7:
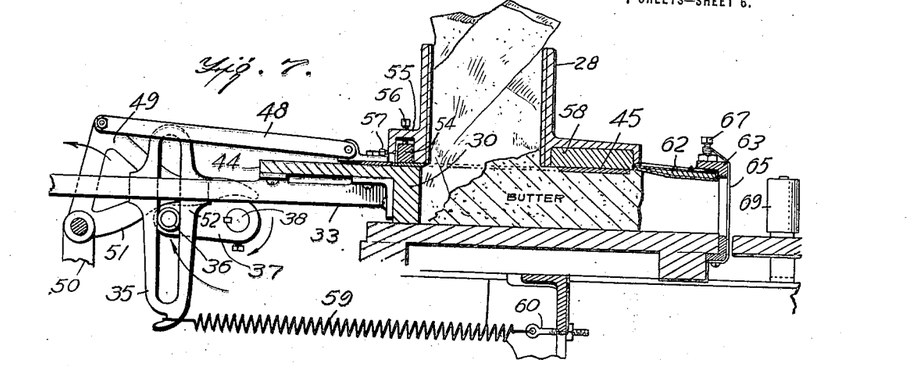
Figure 8:
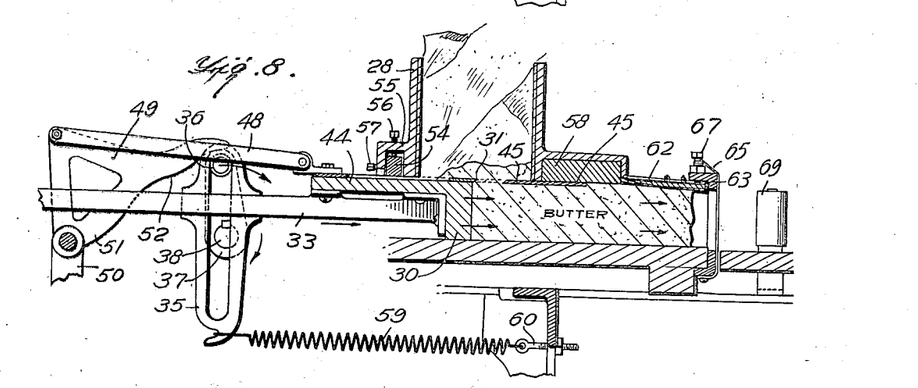
Figure 9:
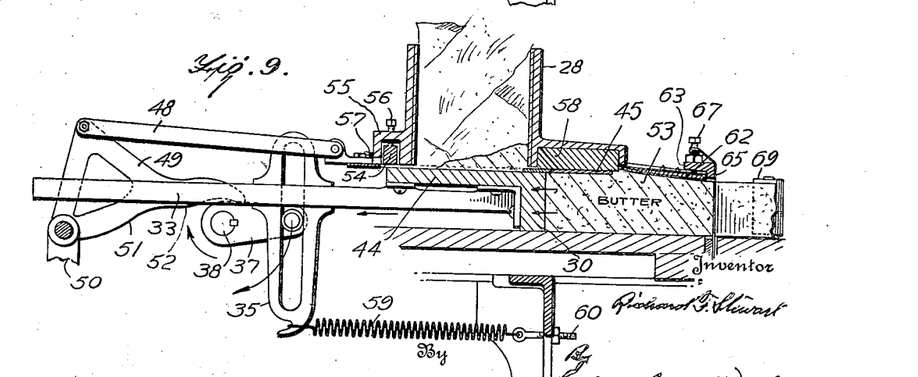
Figure 10:
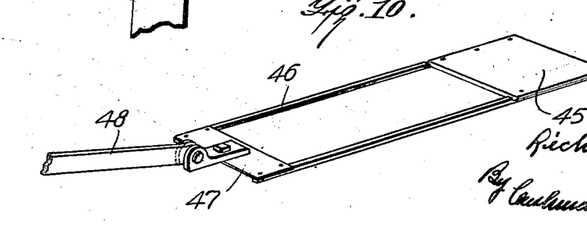
Fig. 10 is a detail view in perspective of one of the block forming knives and its operating frame.
Figure 16:
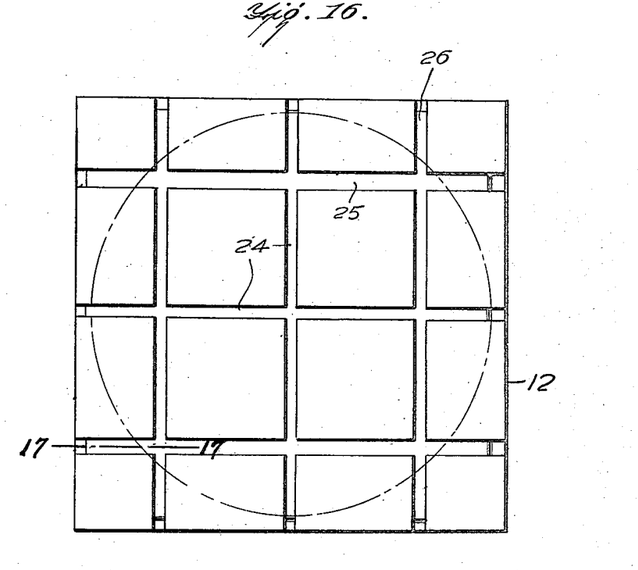
Fig. 16 is a plan view of the tub cutting table.

*Block forming mechanism.*—The slabs 27, one of which is indicated in dotted lines in Fig. 1, are inserted vertically in a hopper 28 (see Figs. 1, 3 and 7–9 inclusive), in a vertical position as shown, said hopper 28 being of a size to take a slab of full cross sectional area cut out from the block. Immediately below the hopper 28 is a block forming chamber 29 into which the lower end of the slab will project, as indicated in Figs. 7 to 9 inclusive, the said chamber 29 being open at both ends and having within it a block severing and advancing plunger 30, which fits closely in the chamber 29 and is provided at its upper face with a severing knife 31, the front edge of which is sharpened with an upward sloping bevel 32. The said plunger 30 has secured to its rear end a plunger rod 33, the tail of which is supported by transverse bearing 34 as shown in Fig. 3. Fixed to the plunger rod 33, or formed integral therewith as may be desired, is a slotted cross yoke 35 engaged by a roller pin 36 on a crank arm 37 fixed to the shaft 38, which shaft is mounted in suitable bearings 39 and 40 (see Fig. 2), and provided at its outer end with a worm wheel (not shown) mounted in a casing 41 secured to the frame of the machine. A suitable worm (not shown) is mounted within the casing in engagement with the worm wheel therein, said worm being driven by a shaft 42 coupled to any suitable power shaft, as, for example, the shaft of an electric motor 43, which is a convenient form of prime motor.

Rotation of the shaft 38 through the worm wheel, worm and prime motor just described, and through the crank 37, crank pin 36 and slotted yoke 35, reciprocates the plunger 30 and knife 31 beneath the hopper 28 and will sever the lower end 37 into a block, it being understood that the dimensions of the chamber 29 will be such as to give a block of any desired weight, for example, a block of two pounds in weight. In order to prevent the slab from falling as the plunger 30 makes its forward cutting thrust, that plunger is provided with a rearwardly extending platform 44, which, when the plunger is in its forward position as shown in Fig. 9, lies beneath the hopper 28 and supports the slab.

It is important in the handling of butter, for forming it into plates that it be not unduly compressed or crushed, and in order that the drag on the lower end of the slab which would result from severing the lower end entirely by the plunger knife 31 may not crush and compress the butter too much, I provide means for partially severing the slab from the opposite side so that the cutting of the block from the slab will be effected simultaneously from opposite sides. This is accomplished by providing a knife 45 carried by a skeleton frame 46, the members of which skeleton frame lie on each side of the mold box or chamber so that the slab may feed downwardly between the frame members. At its opposite end the skeleton frame has a cross plate 47 which is connected with a link 48 coupled at its other end to a rocker 49 pivotally mounted on a suitable support 50 on the machine frame, said rocker having a surface 51 adapted to be engaged at certain angular positions of the crank arm 37 by the crank pin 36, as shown in Figs. 3, 7, 8 and 9, so that the said knife 45 will be given a to and fro movement by this mechanism during a certain angle of revolution of the crank arm 37. The face of the surface 51 is developed as a cammed surface so as to give the proper movement to the link 48, the skeleton frame 46 and the knife 45, which movements are illustrated in Figs. 7 to 9 inclusive.

Referring to these figures, it will be observed in Figure 7, the crank arm revolving in the direction shown by the arrow is about to start the plunger 30 on its forward movement by reason of its engagement with the slotted cross yoke 35, and simultaneously the crank pin 36 engages 51 and starts knife 45 forward from the opposite side of the machine. In order to properly time the approach of the knives 31 and 45 toward each other the surface 51 is given a high spot 52 to quicken the thrust of the knife 45 and bring it forward to the position shown in Figure 8, where it has effected a partial severance of the slab from the side of the hopper opposite from the side from which the knife 31 acts. After the crank pin 36 reaches the top of its stroke as shown in Figure 8, and starts on its downward stroke, thrusting the cross-yoke and its edged plunger forward, the action of the crank pin 36 on surface 51 ceases, that arm falling off the crank pin and dropping to the position shown in Figure 9, leaving the plunger 30 and its knife 31 free to continue its cutting stroke, and after the plunger and knife 31 move forward, the beveled edges of the knives 31 and 45 engage, completing the severance of the slab, and as the plunger advances it forces the knife 45, frame 46, and the released operating parts back to their position of rest as shown in Figs. 7 and 9 with the block 53 completely severed and passing to the mold box. Preferably an adjustable plunger regulating bar 54 is mounted in a suitable housing 55, formed on the hopper 28, this bar 54 being adjusted by means of vertically disposed screws 56, and horizontally arranged holding screws 57 which serve to maintain the bar in proper position in relation to the plunger.

It will be observed that not only do these cut-off knives effectively sever the blocks from the slab, but when the two oppositely moving knives meet, they form a close cover beneath the hopper 28 and the pressure of the plunger 30 as it forces the slabs through the box cannot force the butter forwardly into the hopper.

This constitutes the block severing mechanism of the machine.

The chamber or mold box 29 is preferably provided, as shown in Figs. 7, 8 and 9, with a wooden filler plate 58, beneath which the blade 45 travels, so that the butter which passes through the box is in contact with metal substantially only where it contacts with the cutting blades, which cutting blades will preferably be made of a rustless alloy, it being understood that the hopper 28 and the mold box or chamber 29 are lined with wood.

The slotted cross yoke 35 is preferably coupled by a spring coupling 59 with a fixed point 60 on the machine frame, two coil springs being shown in the present instance as constituting this spring coupling, which is designed to supplement by its pull the action of the crank arm during the forward or working thrust of the plunger 30 and knife 31, the said spring coupling 59 being tensioned as the plunger is being returned after its working stroke. By this arrangement the power stored in the spring 59 durin the non-working stroke of the plunger is expended during the forward or working stroke as the block is being cut from the slab and the plunger movements are steadied.

*Bar shaping and molding mechanism.*—As the blocks are severed from the slabs and fed forward through the mold box or chamber 29 as just described, they will, of course, be forced together with considerable pressure so that they stick or are molded together in the form of a bar, and this bar passes through the mold box and is slightly compressed as it feeds therethrough, the sides of the mold box being wedge-shaped as at 61, (see Fig. 2), so as to compress slightly the blocks. At its forward end, the mold box is provided with a gauge plate 62, which gauge plate is generally wedge-shaped, as shown in Figs. 3 and 20 and is supported adjustably in the frame 63 by suitable adjusting screws 64 so that it will compress more or less according to its adjustment, the top of the bar as it passes through and out of the mold box.

As shown in Fig. 20 the gauge plate 62 is mounted so as to be adjustable vertically, said plate resting at its outer edges on the tops of the side walls of the mold box and so disposed as to rock at its rear end. The adjusting screws 64 will limit the forward movement of this gauge plate 62 and its pressure upon the slot passing through the mold box may be regulated.

The frame 63 constitutes a cutter frame which is removably attached by means of the screws 64ª to the mold box 29. This cutter frame is used when it is desired to split the bar as it issues from the mold box, and in the present instance a single cutting wire 65 is shown, which is stretched from a fixed holding pin 66 at the bottom of the frame to an adjustable screw 67 at the top of the frame, so that it may be given the proper tension and to prevent side slipping of this wire. To insure its being maintained always in a central position, it passes preferably through slotted lugs 68, formed on the front of the cutter frame 63. When the cutter frame is in position, the bar issuing from the mold box will be split longitudinally, and it is obvious that the cutter frame may be provided with any number of wires dependent on the size of the sections into which it is desired to cut the bar.

*Print forming mechanism.*—From this cutter frame the bar passes between the guide rollers 69, preferably of wood, and removably mounted on suitable pins fixed to the frame of the machine. The pins on which the rollers 69 are mounted are fixed upon brackets 69ª which are laterally adjustable so that the rollers 69 may be adjusted in proper relation to the path of the butter. As the split slab comes from the mold box there is a tendency for it to spread and these rollers can be adjusted so as to control this spreading action, and yet permit the prints to separate a little along the central line of cut. These rollers 69, since they revolve easily under the action of the butter do not, of course, cause any drag on the slabs as they pass to the print cutting table. From the rollers the bar passes beneath a print cutter 70, which as shown in the present instance comprises a rectangular frame of any suitable dimensions, which frame 70 has the downwardly projecting wire carrying legs 71 across which suitable cutting wires are stretched, the said wires being seated in grooves in the ends of the legs 71, and connected at their ends to suitable tensioning devices 72. The said cutter frame 70 is supported on sliding bars 73 mounted in suitable slide-ways 74 on the bed of the machine, and coupled at their lower ends with thrust bars 75, which thrust bars at their opposite ends are coupled by links 76 with the main frame of the machine. In order to depress the thrust bars, and pull down the cutter frame 70, a lever 77 is pivoted at 78 on the machine frame 10, said lever having a pull arm 79 linked by a pull link 80 to the thrust bars. In order to hold the thrust bar 75 with its attached cutter frame in the raised position shown in Fig. 3 I preferably provide the bar 79 with a notch as shown in Fig. 3 in which notch the end of the pull arm 79 engages so as to sustain the frame in its upper position. When the lever 77 is thrown forward, that is, toward the right, in Fig. 1, it will depress the thrust bars 75, pull down the cutter support 73, forcing the cutter 70 to its bed 81 and divide the bar into a predetermined number of prints dependent on the arrangement of cutting wires on the frame 70, the bed 81 being plain or cross-recessed to receive the cutting wires on the frame.

The cutter frame 70 is so mounted on the side bars 73 that it may be laterally shifted relative to the side bars which as stated reciprocate vertically in the keepers 74, this shaft of the cutter frame 70 being desirable in order that it may be properly positioned relative to and make a proper cut of the slabs issuing from the mold box. As these slabs issue from the mold box on to the print cutting table 81, they do not always stop at the same place, and it is desirable, of course, to have some flexibility of the print cutter in order that it may take care of these slight variations and there may be no waste in cutting the prints. In order to provide for this shifting of the print cutting frame 70, I provide it with slide-ways 70ª which engage runner plates 70ᵇ at the upper ends of the arms 73, the engagement between these parts being sufficiently snug to prevent accidental displacement or shift of the frame 70, and yet to permit it to be adjusted by the operator to take care of variations in the stopping of the butter as it is projected from the mold box.

The prints thus formed will, of course, be periodically fed forward as the machine operates, and the plunger 30 cuts off the blocks and pushes them through the machine. The prints will, of course, under pressure be brought together and will stick slightly, although they will not become molded together as do the blocks in passing through the mold box, for the reason that there is no drag upon them, but in order that they may separate so that they may be readily picked up and set off on the wrapping tables by the operator, I provide the table 81, adjacent the cutter frame with means for breaking the prints if they stick together, the arrangement being such that they are broken in both directions as they are fed forward from beneath the print cutter. At the point 83, the table is inclined from an upper to a lower level so that the prints as they drop off the higher level will break transversely of the machine along the cut lines, sufficiently separating the prints so as to prevent sticking. Beyond the break 83, the table is peaked centrally at 84, and the surfaces on each side of the center curve outward and downward, so that, as the prints already broken and separated in one direction by the breaking ledge 83 pass to the peaked area 84, it will be broken so as to divide the prints in the other direction and separate them. It is obvious that the peaked table 84 may be arranged so as to provide a plurality of peaked areas, if desired, as shown in Fig. 13.

From the final breaking table, the prints are removed to side tables 85 which may be conveniently attached on either side of the machine, or they may, of course, be taken to independent wrapping tables or wrapping machines, where they are finally wrapped ready for the market.

It will be understood that this disclosure is merely illustrative of one embodiment of the invention, and that I do not limit myself to mechanical details or expedients, but regard as within the range of my invention any equivalent mechanisms which may be substituted to secure the results aimed at and secured by the specific disclosure herein.

Having thus described my invention, what is claimed is:

1. In a machine of the class described, the combination of a mold box having a feed opening in a wall thereof, a plunger in said box for severing and advancing material entering said box through the feed opening, means independent of said plunger and operating oppositely thereto to sever the material, and means for operating said plunger and independent oppositely acting severing means.

2. In a machine of the class described, the combination of a mold box having a feed opening in a wall thereof, a continuously reciprocating plunger in said box for severing and advancing material entering said box through the feed opening, and an independent intermittently reciprocating severing means acting in opposition to said plunger to sever the material.

3. In a machine of the class described, the combination of a mold box having a feed opening in a wall thereof, a plunger in said box for severing and advancing material entering said box through the feed opening, means for continuously reciprocating said plunger, independent severing means acting in opposition to said plunger, and connections between said independent means and said plunger operating means to intermittently reciprocate said independent severing means.

4. In a machine of the class described, the combination of a mold box having a feed opening in a wall thereof, a plunger in said box for severing and advancing material entering said box through the feed opening, a slotted yoke carried by said plunger, a crank arm engaging said yoke to continuously reciprocate said plunger, independent severing means acting in opposition to said plunger, and means for actuating said independent severing means engaging said crank arm during a portion only of its revolution to give a non-continuous reciprocation to said independent severing means.

5. In a machine of the class described, the combination of a mold box having a feed opening in a wall thereof, a plunger in said box for severing and advancing material entering said box through the feed opening, a slotted yoke and crank arm for continuously reciprocating said plunger, an independent severing knife acting in opposition to said plunger, an open knife carrying frame spanning said feed opening, and a connection between said knife frame and plunger operating mechanism to impart a non-continuous reciprocation to said independent severing knife.

6. In a machine of the class described, the combination of a mold box having a feed opening in a wall thereof, a plunger in said box for severing and advancing material entering said box through the feed opening, an independent severing knife acting in opposition to said plunger, an open knife carrying frame spanning said feed opening, a plunger actuating rod, a support for the rear end of said rod, a crank arm between said plunger and said support, a slotted cross yoke on said crank arm, a rocker arm pivoted adjacent said crank arm and adapted to engage said crank arm during a portion only of its revolution, and connections between said rocker arm and said independent severing knife frame to impart intermittent reciprocations to said independent knife.

7. In a machine of the class described, the combination of a mold box having a feed opening in a wall thereof, a plunger in said box for severing and advancing material entering said box through the feed opening, means for reciprocating said plunger, and supplemental means for imparting movement to said plunger during its cutting and advancing stroke.

8. In a machine of the class described, the combination of a mold box having a feed opening in a wall thereof, a plunger in said box for severing and advancing material entering said box through the feed opening, means for reciprocating said plunger, and a spring for imparting movement to said plunger during its cutting and advancing stroke.

9. In a machine of the class described, the combination of a mold box having a feed opening in a wall thereof, a plunger in said box for severing and advancing material entering said box through the feed opening, a crank and slotted cross yoke for reciprocating said plunger, and a spring connected with said cross yoke and adapted to supplement the action of said crank during the cutting and advancing stroke of said plunger.

10. In a machine of the class described, the combination of a mold box having a feed opening in a wall thereof, a severing knife at one side of said feed opening, means for continuously reciprocating said knife, a second knife on the other side of said feed opening and means for imparting an intermittent reciprocation to said second knife.

11. In a machine of the class described, the combination of a mold box having a feed opening in a wall thereof, a severing knife on one side of said opening, means for continuously reciprocating said knife, a second severing knife on the opposite side of said feed opening and means for advancing said second knife a predetermined distance and then releasing it.

12. In a machine of the class described, the combination of a mold box having a feed opening in a wall thereof, a severing knife on one side of said feed opening, means for reciprocating said knife, a second severing knife on the opposite side of said feeder, and means for advancing said second knife and then releasing it, said knives being so disposed as to effect the return of said second knife by the continuous movement of said first knife.

13. In a machine of the class described, the combination of a mold box having a feed opening in a wall thereof, a severing knife on one side of said feed opening, means for continuously reciprocating said knife, a second knife on the opposite side of said feed opening, and means for positively advancing said second knife a predetermined distance and then releasing it, said knives having oppositely bevelled cutting edges adapted to engage and upon continued movement of said first knife return said second knife to its original position.

14. In a machine of the class described, the combination of a mold box having a feed opening in a wall thereof, a severing knife on one side of said feed opening, a second severing knife on the opposite side of said opening, means for simultaneously advancing said knives toward each other, and means for intermitting the advance of one knife after a predetermined movement.

15. In a machine of the class described, the combination of a mold box having a feed opening in a wall thereof, a severing knife on one side of said feed opening, a second severing knife on the opposite side of said opening, means for simultaneously advancing said knives toward each other, and means for intermitting the advance of said second knife after a predetermined movement.

16. In a machine of the class described, the combination of a mold box having a feed opening in a wall thereof, a severing knife on one side of said feed opening, a second severing knife on the opposite side of said feed opening, actuating means to impart a continuous reciprocation thereto, and connections between the one of said knives and said actuating means to positively reciprocate said knife in one direction only.

17. In a machine of the class described, the combination of a mold box having a feed opening in a wall thereof, a severing knife on one side of said feed opening, a severing knife on the opposite side of said feed opening, means for continuously reciprocating said first knife, and means for positively reciprocating said second knife intermittently in one direction only.

18. In a machine of the class described, the combination of a mold box having a feed opening in a wall thereof, a severing knife on one side of said feed opening, a second severing knife on the opposite side of said feed opening, a single actuating means for said knives, connections between said first knife and said actuating means to impart a continuous reciprocation thereto, and connections between said second knife and said actuating means to positively and intermittently reciprocate said second knife in one direction only.

19. In a machine of the class described, the combination of a mold box having a feed opening in a wall thereof, a severing knife on one side of said mold box, a second severing knife on the opposite side of said mold box, means for advancing said knives toward each other to sever the material coming through the feed opening, and material supporting aprons extending rearwardly from the cutting edge of each knife.

20. A severing knife for machines of the class described, comprising a blade, an open frame extending therefrom, and means at the opposite end of said open frame to connect said knife with suitable knife operating means.

21. A severing knife for machines of the class described, comprising a bevelled blade, separated bars extending from the bevelled edge of said blade to form an open frame work, and a cross plate at the opposite ends of said bars to couple said knife to a suitable operating mechanism.

22. In a machine of the class described, the combination of a mold box, a reciprocating plunger in said mold box for advancing material fed thereto, and a pressure bar engaging the upper side of said plunger.

23. In a machine of the class described, the combination of a mold box, a reciprocating plunger in said mold box for advancing material fed thereto, and a vertically adjustable pressure bar engaging the upper side of said plunger.

24. In a machine of the class described, the combination of a mold box having a feed opening in a wall thereof, a plunger in said box for advancing material entering said box through the feed opening, and a vertically adjustable pressure bar engaging said plunger in the rear of said feed opening.

25. A severing knife for machines of the class described, comprising an aproned knife having a bevelled cutting edge, bars secured to said knife and extending forwardly from said cutting edge to form an open frame, and a cross plate at the opposite ends of said bars to form connecting means with suitable knife operating mechanism.

26. In a machine of the class described, the combination of a mold box, material advancing means in said box, and a delivery throat the side and top walls of which converge toward the delivery end thereof, said top wall being adjustable to vary the size of the delivery opening.

27. In a machine of the class described, the combination of a slab receiving table, a reciprocating print cutter frame mounted above said table, and means for operating said cutter comprising depending legs secured at their upper ends to said cutter, and at their lower ends to a rocking lever.

28. In a machine of the class described, the combination of a slab receiving table, a cutter frame mounted to reciprocate above said table, and operating means for said cutter frame, comprising a hand lever pivoted to said table, and so coupled to the lower portion of said frame as to maintain it in either its lower or upper positions after operation.

29. In a machine of the class described, the combination of a slab receiving table, a cutter frame mounted to reciprocate above said table, thrust bars coupled to the lower portion of said cutter frame, and a rocking lever pivotally mounted on the table and in engagement with said thrust bars, said lever being so disposed as to maintain said cutter frame in either its upper or lower positions after operation.

30. In a machine of the class described, the combination of a slab receiving table, a reciprocating cutter frame above said table having supporting legs depending through slideways on said table, and a hand lever pivotally mounted on said table and coupled to said legs to reciprocate said cutter frame, said lever being so mounted as to maintain said frame in either its upper or lower position after operation.

31. In a machine of the class described, the combination of a slab receiving table, a cutter frame mounted to reciprocate above said table, supporting legs depending through suitable slideways on said table, thrust rods connected with said legs, and a pivotally mounted hand lever engaging said thrust rods to elevate or depress said cutter frame, said lever being so disposed as to maintain said cutter frame in either its upper or lower positions after operation.

32. A block receiving table for machines of the class described, having cutter receiving recesses in the face thereof, the bottoms of which recesses are bevelled downwardly at their ends.

33. In a machine of the class described, the combination with a print forming table, of a print receiving table adjacent said print forming table and disposed at a different level, whereby the prints are separated as they pass from the forming table to the receiving table.

34. In a machine of the class described, the combination with a print forming table, of a print receiving table adjacent said print forming table and disposed at a lower level, whereby the prints are separated as they pass from the forming table to the receiving table.

35. A print receiving table having means for breaking the print comprising a plurality of surfaces inclined transversely of the line of movement of the prints.

36. A print receiving table having means for breaking the print comprising a plurality of surfaces oppositely inclined transversely of the line of movement of the prints.

37. A print receiving table having means for breaking the print comprising a surface provided with longitudinally disposed ridges and depressions.

38. In a machine of the class described, the combination with slab forming and molding instrumentalities, of a slab receiving table, and slab guiding rollers between said table and said slab forming instrumentalities.

39. In a machine of the class described, the combination with slab forming and molding instrumentalities, of a slab receiving table, and adjustable slab guiding rollers between said table and said slab forming instrumentalities.

40. In a machine of the class described, the combination of a slab receiving table, a cutter frame mounted to reciprocate above said table, thrust bars coupled to said cutter frame and provided with notches, and a rocking lever pivotally mounted on the table and in engagement with said thrust bars, the end of said lever adapted to engage the notch in said thrust bar and maintain the bar and cutter frame in elevated position.

41. In a machine of the class described, the combination of a slab receiving table, cutter frame supports reciprocating relative to said table and a cutter frame shiftably mounted on said reciprocating supports.

42. In a machine of the class described, the combination of a slab receiving table, vertically reciprocable cutter supports mounted on said table and a cutter frame mounted on said supports and shiftable laterally thereon.

43. In a machine of the class described, the combination of a slab receiving table, vertically reciprocable cutter supports mounted on said table and a cutter frame carried by said supports and shiftable horizontally thereon.

44. A cutting plate or bed for machines of the character described, having cutter receiving recesses in its surface, one at least of which is wider than the said other recesses.

45. A cutting plate or bed for machines of the character described, having a plurality of cutter receiving recesses in its surface, the two outer recesses being wider than the others.

In testimony whereof I have hereunto set my hand.

RICHARD F. STEWART.